(12) United States Patent
Teifke et al.

(10) Patent No.: US 7,841,672 B2
(45) Date of Patent: Nov. 30, 2010

(54) ELECTRONIC BRAKE CONTROLLER WITH SELECTABLE DISPLAY

(75) Inventors: Richard J. Teifke, Mexico, NY (US); John J. Allen, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 1134 days.

(21) Appl. No.: 11/227,100

(22) Filed: Sep. 16, 2005

(65) Prior Publication Data

US 2007/0063581 A1  Mar. 22, 2007

(51) Int. Cl.
*B60T 13/00* (2006.01)
*B60T 15/14* (2006.01)

(52) U.S. Cl. .................... 303/20; 303/3; 303/15

(58) Field of Classification Search ............ 303/3, 303/7, 15, 20, 138, 155; 188/1.11 R, 1.11 E
See application file for complete search history.

(56) References Cited

U.S. PATENT DOCUMENTS

| | | | |
|---|---|---|---|
| 5,172,316 A | 12/1992 | Root et al. | |
| 5,383,717 A * | 1/1995 | Fernandez et al. | 303/3 |
| 5,415,465 A | 5/1995 | Skantar et al. | |
| 5,549,365 A * | 8/1996 | Vernier et al. | 303/20 |
| 5,718,487 A * | 2/1998 | Roselli et al. | 303/14 |
| 6,227,625 B1 * | 5/2001 | Gaughan | 303/15 |
| 6,286,911 B1 | 9/2001 | Wright et al. | |
| 6,401,015 B1 * | 6/2002 | Stewart et al. | 701/19 |

* cited by examiner

*Primary Examiner*—Robert A Siconolfi
*Assistant Examiner*—Vu Q Nguyen
(74) *Attorney, Agent, or Firm*—Barnes & Thornburg LLP (57) ABSTRACT

An electronic brake controller for an electropneumatic brake system includes a housing; at least one brake operator mounted to said housing and whose position defines desired brake action; a display on said housing; a signal output on the housing; and a multiple position switch on the housing. A controller in said housing determines the position of the operator and the multiple position switch, provides one of operator position signal and desired brake action to the output and drives the display to display desired braking action as a function of the determined position of the operator for acceptable operator positions, and drives the display with a brake system variable and adjusts the variable as a function of the position of the multiple position switch for don't care operator positions.

21 Claims, 5 Drawing Sheets

PRIOR ART

```
   OKAY TO RUN
  ER TARGET = 90
```

*FIG. 6A*

```
   FAULT PENALTY
  PUT AUTO IN SUPP
```

*FIG. 6B*

```
  OPERATOR EMER
       WAIT
```

*FIG. 6C*

```
  FAULT 10 ACTIVE
    SHUT AB OFF
```

*FIG. 6D*

ELECTRONIC BRAKE CONTROLLER WITH SELECTABLE DISPLAY

BACKGROUND AND SUMMARY OF THE INVENTION

The present invention relates generally to electronic brake controllers or values and more specifically to an electronic brake controller with a selectable display.

In computer controlled railway brake equipment, desired braking actions come from a manual brake stand having an automatic brake and an independent brake handle. These mechanical movements are converted to electrical signals and provided to a microcomputer. The microcomputer controls the train pipelines and reservoirs using an electropneumatic brake interface system. A screen is provided in the cabin to let the operator know various information throughout the train. Typically, the displayed information is the pressure at the main reservoir, equalization reservoir, brake pipe, brake pipe at the end of train and the brake cylinder. An example of a computer controlled railway brake equipment is the CCB system available from New York Air Brake Corporation which is also described in U.S. Pat. No. 5,172,316 which is incorporated herein by reference. An example of the display screen is in FIG. 4 of the '316 patent.

The provision of a screen or display at the electric brake controller valve is illustrated in U.S. Pat. No. 6,286,911 which is incorporated here by reference. A controller in the housing determines the position of the operators and provides operator position signals at its output and drives the display to display the desired braking action as a function of the determined position of the operators. Additional information provided to the controller may also be displayed. Switch positions can be checked to determine whether the handle has failed. Failure or other faults may be logged in an event or fault summary.

Electronic brake controller valve including a keyboard to transmit information to a remote cab control central processing unit is described in U.S. Pat. No. 5,415,465. The key pad is used to select operations in a setup screen and then to display information in a run time screen or menu. The screen and new information are remote from the controller and the electronic brake controller valve.

The present disclosure is directed to an electronic brake controller for an electropneumatic brake system including a housing; at lease one brake operator mounted to said housing and whose positions define desired brake action; a display on said housing; a signal output on the housing; and a multiple position switch on the housing. A controller in said housing determines the position of the operator and the multiple position switch, provides one of operator position signals and desired brake action to the output and drives the display to display desired braking action as a function of the determined position of the operator for acceptable operator positions, and drives the display with a brake system variable and adjusts the variable as a function of the position of the multiple position switch for don't care operator positions.

The controller may also provide output signals of the system variable to the output as a function of the position of the multiple position switch for don't care operator positions. The multiple position switch may be a feed valve switch and/or a locomotive mode switch.

The multiple position switch may be a feed valve switch having a neutral, increase and decrease positions. The controller drives the display to display a target feed valve value and provides the target feed valve value to the output as a function of the position of the feed valve switch when the brake operator is in an release position. The controller drives the display to display an other brake system target value and provides the other target value to the output as a function of the position of the feed valve switch when the brake operator is in don't care operator positions.

The multiple position switch may be a locomotive mode switch having at least an in and out position, but may have a lead, trail and lead out positions or other combinations of operational modes. The controller provides the mode switch position to the output as a function of the position of the mode switch when the brake operator is in an acceptable position. The controller drives the display to display an other brake system target value and provides the other target value to the output as a function of the position of the mode switch when the brake operator is in don't care operator positions.

The electronic brake controller may include a two position switch. The controller changes the type of system variable displayed as a function of the position of the two position switch and adjusts the system variable as a function of the position of the multiple position switch. The system variable may be a multi digit number; and the controller sequences through the digit in response to the two position switch and adjust the digit in response to the multiple position switch.

The controller may display a list of electrical devices in the housing and selects an electrical device whose one of state and output value is to be displayed as a function of the position of the multiple position switch. The controller adjusts the one of the state and value of the output of the selected electrical device as a function of the position of the multiple position switch.

Other objects, advantages and novel features of the present invention will become apparent from the following detailed description of the invention when considered in conjunction with the accompanying drawings.

DETAILED DESCRIPTION OF THE DRAWINGS

Figure 1:
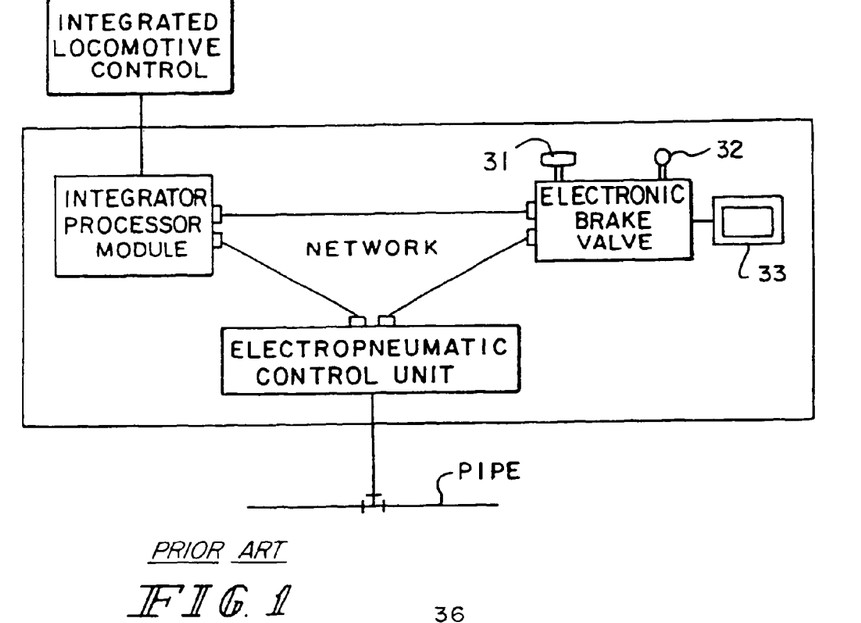
FIG. 1 is a block diagram of a computer controlled railroad brake system of the prior art.

An overview of a locomotive brake control unit including an electronic brake controller with display is illustrated in FIG. 1. The electronic brake controller with display is shown as electronic brake valve EBV which serves as the input portion through the human-machine interface. The electronic brake valve EBV includes brake operators shown as the automatic brake handle 31, independent brake handle 32 and a bail-off switch (not shown). Alternatively, the brake handles could be replaced with push buttons. An easy to read digital display 33 provides information. As a failsafe feature, the electric brake valve EBV operates a direct acting emergency venting of the brake pipe. The display 33 is configurable under microprocessor control at electronic brake valve EBV.

An integrated processor module IPM is the host computer for distributive power in an electronic air brake system. The IPM manages the electrical interfaces between the brake system, the locomotive and the train. It communicates with integrated locomotive control ILC and interfaces electrical trainlines (not shown). The IPM also has the ability to handle and/or include distributed power with the appropriate hardware and software upgrades. The IPM provides high level brake control logic, locomotive system integration communication or interfacing. It should be noted that a preferred distributor system is LOCOTROL Distributed Power Control available from GETS-Global Signalling. It includes a display, for example, pressure and remote sessions, set up capability (lead/trail), penalties and diagnostic file log.

An electropneumatic control unit EPCU manages the pneumatic interface between the brake system, the locomotive and the train. It controls the locomotive brake cylinders, brake pipe, independent application and release pipe and the actuating pipe, for example. The electropneumatic control unit includes those portions of the system which relate to controlling the individual pipes directly or using reference reservoirs. For example, the pressure in an equalization reservoir is used to pneumatically control the pressure in the brake pipe, which in turn pneumatically transmits brake control signals to the brakes on each car in the train.

The different portions of the locomotive control unit are interconnected by an Echelon LonWorks Network. This not only interconnects the modules of the EPCU, but also connects the EPCU to the IPM and EBV and optionally the train EP brakes. The system also has the capability of communicating with electropneumatic controls to each of the individual cars. Since the American Association of Railroads, AAR, has selected a standard for electropneumatic car brakes incorporating the Echelon LonWorks communication protocol, ease of communication is improved. This reduces the number of protocols throughout the train system.

The automatic brake handle 31 has the following six positions as illustrated in FIG. 2 of U.S. Pat. No. 5,172,316: a) Release, b) Minimum Reduction, c) Full Service, d) Suppression, e) Handle Off, and f) Emergency.

The electronic brake valve or controller EBV also responds to movement of an independent brake handle 32 by the train operator to control the application and release of the locomotive brakes independently of the train brakes. The independent brake handle 32 has two extreme positions, Release and Full Application separated by an application zone as shown in FIG. 2 of U.S. Pat. No. 5,172,316. As the handle is moved from the Release position through the application zone toward the Full Application position, it will apply the locomotive brakes.

The bailoff operator causes the release of any automatic brake application existing on the locomotive (due to operation of the automatic brake handle 31). If the independent brake handle 32 is in an Application position, the locomotive brake will be applied according to the higher of independent or automatic brake. The bailoff operator could be included as part of the independent brake handle 32, the automatic brake handle 31 or an independent button on or off the brake handles. If a separate button is not used, depressing or lifting one of the brake handles would produce bailoff. A bail off button 36 is shown as part of the independent brake handle.

Figure 2:
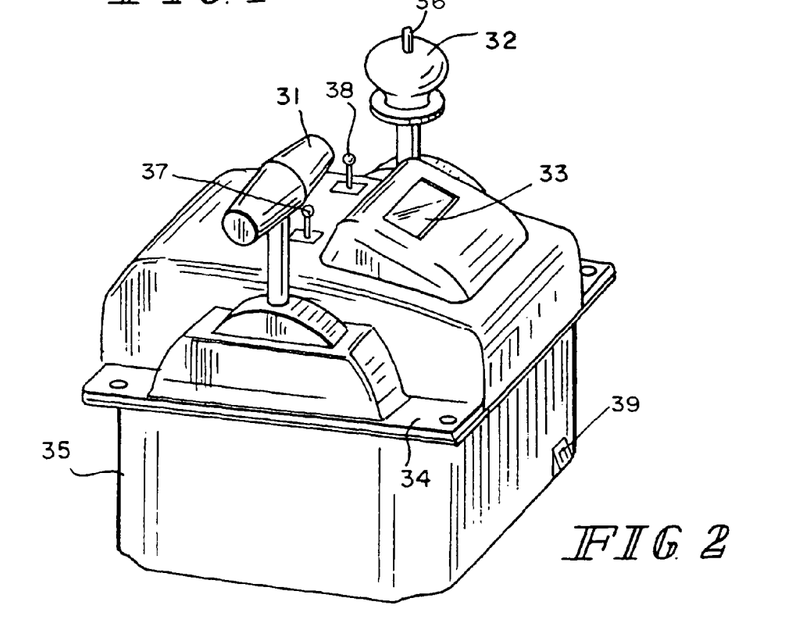
FIG. 2 is a perspective view of an electronic brake controller with display according to the present disclosure.

Also part of the electronic brake valve EBV includes two multiple position switches, for example a feed valve switch 37 and a locomotive mode switch 38. The feed valve switch 37 is a three position switch having a neutral position between the increased and decreased positions. The feed valve switch 37 provides signals to the controller EBV which is transmitted to the system to set the feed valve value which determines the maximum pressure in the brake pipe. The feed valve was adjusted until a gauge within the cabin indicated the appropriate pressure. The present disclosure allows display of this information on display 33. Although the switches 37 and 38 are shown on top adjacent the display 33, either or both may be on the flanges adjacent one or both of the handles 31 and 32.

The locomotive mode switch 38 has multiple positions which may include lead, trail and lead out. It may also be a two position switch with just in and out or a four position switch with trail, lead out, freight in and passenger in. This information is transmitted on the system through the IPM and the ILC. Only one locomotive in the train can be a lead locomotive and the others are a trail locomotive. The mode selected can also be displayed on 33 while in prior models there is displayed elsewhere within the locomotive cabin, as described in the previous mentioned U.S. Pat. No. 5,415,465.

As illustrated in FIG. 2, the automatic and independent handles 31 and 32 as well as the bail off button 36, the switches 37 and 38 and the controller for the display 33 are mounted in a housing of the electronic brake valve EBV. The housing includes a cover 34 and a base 35. The display 33 itself is mounted in the cover 34 while the electronics and any pneumatic connections and controls are provided in the base 35. The electronic brake valve EBV provides the human to computer interface for control of the automatic brake, bail-off and independent brake functions. The electronic brake valve EBV receives signals representing the position of the automatic brake handle 31, the independent brake handle 32 and the bail off button 36 and determines the position of the handles and button. It uses this information to drive the display 33 as well as providing the handle positions, which represent desired braking action to the IPM and the EPCU.

Figure 3:
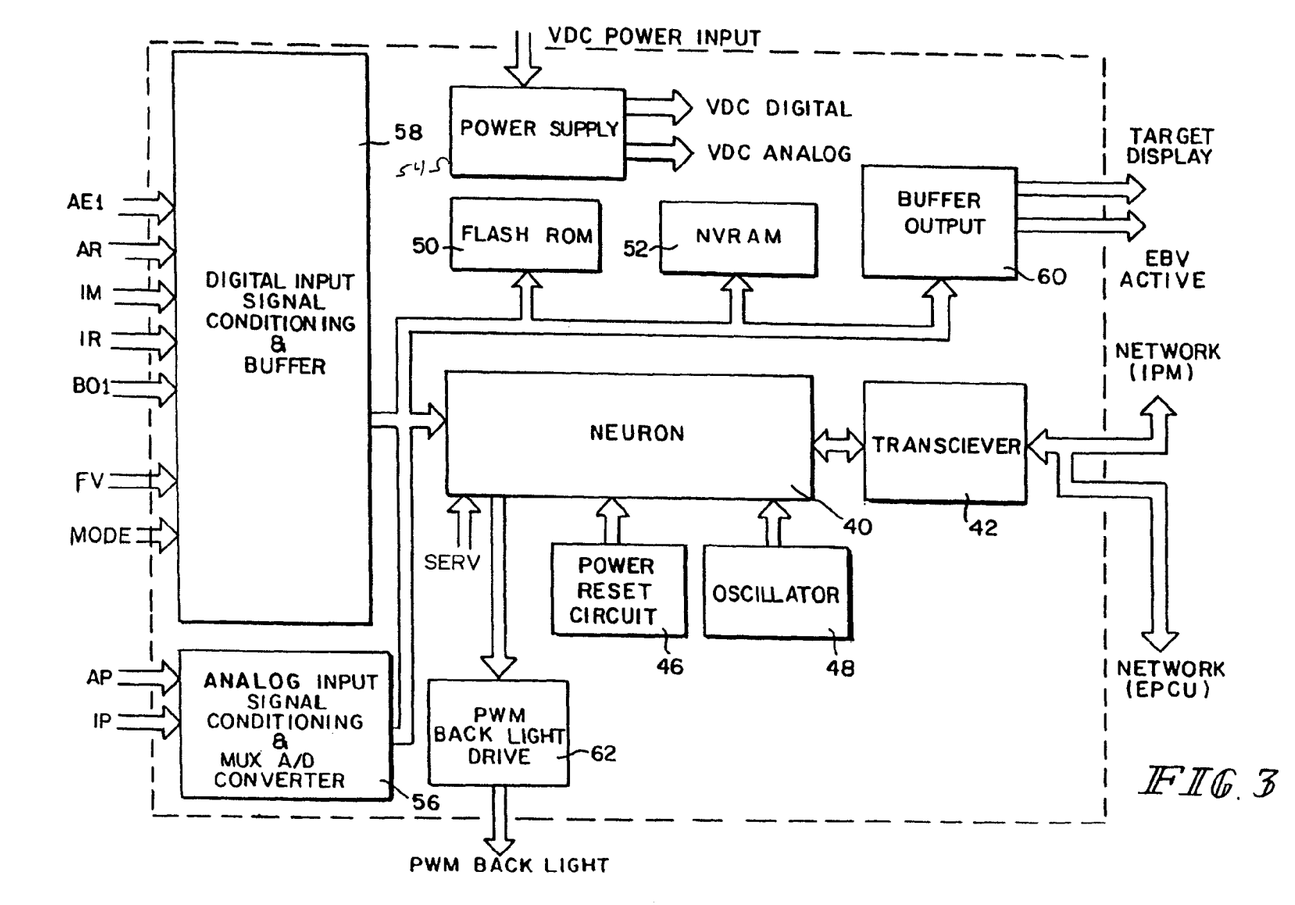
FIG. 3 is a block diagram schematic of an electronic brake controller according to the present disclosure.

An electronic brake valve control node is shown diagramically in FIG. 3. A controller or microcomputer 40, illustrated as a Neuron chip of a Lonworks Network, via a transceiver 42 communicates over a line network with the IPM and the EPCU. Power reset circuit 46 and oscillator 48 are connected to the microcomputer 40. Also, flash ROM 50 and NVRAM 52 are in communication with the microcomputer 40. A power source 54 receives an external voltage, for example 24 volts, and provides internal DC digital and analog voltages, for example, 5 volts. Analog input signal conditioning and mux A/D converter 56 receives analog signals AP and IP from the automatic and independent brake handles 31 and 32 respectfully.

The automatic brake handle 31 provides an analog signal to the microcomputer 40 to the level of command brake or special commands. This signals the microcomputer 40 and in turn the EPCU to reduce the brake pipe pressures sufficient to initiate quick service and set the brakes on the cars. The Full Service brake application position provides a further decrease in its analog signal. Movement of the handle 31 from the Minimum position signals further reduction of the brake pipe proportional to the handle position up to the Full Service or maximum service brake position.

The microcomputer 40 via EPCU controls the brake pipe in such a manner that via the Full Service position is the maximum service brake available for the initial brake pipe setting. The microcomputer 40 has the capability of proportioning the brake pipe signals as a function of minimum service to a full service application based on the initial brake pipe setting.

A Suppression position provided on a standard automatic handle 31 may be ignored by the microcomputer logic. It is only provided for the engineers' convenience. The purpose of the Suppression position is to indicate that the handle is in Full Service and to suppress the overspeed and/or safety control logic, therefore the Full Service position is sufficient for this purpose.

The Handle Off position is also not required but may be used to signal to the microcomputer 40 and in turn the EPCU to reduce the brake pipe pressure to zero.

The Emergency position has the least analog output and signals the microcomputer 40 that an emergency reduction of the brake pipe is required. This position mechanically sends the brake pipe directly to atmosphere and results in an emergency application regardless of state of the computer or cut-off device.

For failure of the automatic brake handle 31 or loss of the analog signal, the microcomputer 40 will interpret this as a reduction of the brake pipe to zero at a service rate. This is the same command as the Handle Off position.

The independent brake handle 32, which provides independent control over the locomotive brake versus the train brake of the automatic brake handle 31, also provides an analog output signal to the microcomputer 40 proportional to handling extreme positions. Unlike the automatic brake handle 31, loss of an analog signal from the independent brake handle 32 results in releasing the locomotive brake and does not result in a brake application as in the independent brake handle failure. Thus the engineer has the option of completing the run or moving to a sidetrack from the leading cab. Independent brake handle 32 moves between the Release position as a minimum analog output signal to the Full position which has the maximum analog output signal. This movement will result in a fully variable analog output signal in either direction and a fully variable increase and decrease of pressure in the independent application and release pipe under the command of EPCU.

A digital input signal conditioning and buffer 58 receives digital input signals provided by various switches in the electronic brake valve EBV. The inputs include a release switch AR and an emergency switch AE1 found on the automatic handle 31 to indicate that the handle is at either limits of its movement. A release switch IR and a full switch IM are found on the independent handle 32 to indicate that the handle at either limit of its movement. A bail-off switch B01 is the fifth input and is used by the operator to indicate to the system its desire to release any automatic brake on the locomotive that may be applied. This is provided by depressing the independent brake handle 32 or any other mechanism such as button 36.

For example a pair of inputs FV from the feed valve switch 37 is provided to 58. Similarly, the input mode is for example four inputs from the locomotive mode switch 38. One of the inputs may be a default input if no other switch input is provided. An additional input is the service input SERV to Neuron 40 that is controllable externally to the housing 35 at 39 in FIG. 2.

The microcomputer 40, determines the position of the handle using the digital input of the switches and the analog voltage level to determine the actual handle position of each handle. Calibration data stored in the non-volatile memory 52 is used in determining the handle position to compensate for minor manufacturing differences, drift or cause of variation from system to system. This handle position information is provided to the rest of the system in a standard format. Information in a fault summary can also be used to determine the handle position as some faults may indicate improper handle positions. For example, if a release switch is known to have failed, it can be ignored, but if one of the analog inputs fail, the fault handle position must be assumed. The handle positions are then transmitted over the Lon network through transceiver 42.

The microcomputer 40 also takes the standard handle information being provided to the system and calculates an appropriate value to display locally, depending upon the display configuration determined by the system. These outputs are provided via buffer output 60 to the display 33. An output from microcomputer 40 is provided to the back light by driver 62.

For standard or acceptable combination of brake handle 31 and 32 positions, the display 33 is driven to display desired braking action. These include the target equalization reservoir value, the target brake pipe reduction value or the percentage of full travel of the handle. When the target equalization reservoir is displayed, the equalization reservoir target of the automatic handle position will be used. When target brake pipe reduction is displayed, the difference between the release value of the equalization reservoir and the equalization reservoir target will be displayed. When the percentage of full travel is displayed, the relative position will be displayed where zero would equal release and 100 would be the emergency position of the automatic handle.

Also, the display could indicate the zones in which the handle occurs. For example, the following zones could be displayed with the appropriate abbreviation:

| | |
|---|---|
| Release = | REL |
| Minimum Application = | MIN |
| Service Application = | SRVO through SRV9 |
| Full Service = | FULL |
| Suppression = | SUPP |
| Handle Off = | HO |
| Emergency = | EMRG |

As previously discussed, the display can be driven to display the feed valve value and adjustment thereto in response to the position of the feed valve switch 37. Also, the locomotive mode can be displayed and adjusted under the control of the locomotive mode switch 38. Although each of those displays can take place for a number of acceptable combinations brake handle positions, it is beneficial to drive the display when the brake handle are not in a braking position. Thus, when there is no competition for the display. This may be for example Release or Handle Brake off position.

The display configuration data will be stored in the non-volatile memory 52. The display configuration can be programmed locally through an input or may be received over the LonWorks. If the microcomputer is a Neuron chip, the configuration would be transmitted over the LonWorks. Similarly, the reading of its digital and analog input as well as the calculation of the handle positions and reporting would also be controlled remotely over the Lon network. A test pattern can also be stored and displayed wherein all segments will be flashed on and off for ten seconds.

In addition to the input to the controller portion of the electronic brake valve that is used to drive display 33 using dedicated feed valve switch 37 and locomotive mode switch 38 to drive the display with non brake handle related values, other displays may be produced for various don't care combinations of the brake handles 31 and 32. These may be defined by the specific combination of brake handle position 31 and 32 by themselves or in combination of with the bail off switch 36, the feed valve switch 37 and the locomotive mode switch 38. As previously discussed, the feed valve switch 37 and the locomotive switch 38 are multiple position switches.

The bail off switch 36 is a two position switch namely on and off. This information can be used by the controller 40 to provide appropriate information for the display 33 as well as to be transmitted at different values as an output on the network. Another control input which can be used to select and drive the display 33 may be the service pin 39 to the Neuron or controller 40.

The display 33 may be initially driven with a menu to allow selection of a plurality of brake system variables. The next step would be to adjust the variable if adjustable. This may be based on the position of one of the multiple position switches, namely the feed valve switch 37 or the mode switch 38 or the bail off switch 36.

One of the menu entries may be language selection. Depending upon the country that the electronic brake valve is being delivered to, there may be two or more selections. If there is just two, once the language item has been selected in the menu, a multiple position switch may be used to toggle between the languages if there are three or more languages. Again one of the multiple position switches may be used to scroll through the selections until a final selection is made. As previously discussed these selections are made for don't care combinations of a brake handle and other brake handles. Scrolling can take places as long as one of the two position switches is in its scroll position or may move for each depression of the scroll of the two position switch. Also a three position switch may be used wherein one position is scrolling in one direction, and a second position being scrolling in the opposite direction. This would include the feed valve switch 37 and the locomotive mode switch 38. The two position switch would be the bail off switch 36 or switch activate the service pin, this toggling or scrolling is also applicable to the menu selection.

Another feature that may be provided is to the scroll through and select a particular transducer within the electric brake valve EBV. Once this transducer is selected using a combination of the multiple switches, one of multiple position switches would be used then to adjust the value or calibrate the transducer such that its value matches the desired value for that variable. For example, if the brake pipe transducer is supposed to read 90 psi, the brake pipe transducer would then be adjusted such that its present reading would match 90 psi. Other electrical devices within the system or the electric brake valve may be selected from the menu and their present reading read. This could include potentiometer and other sensors. Various switches within the electric brake valve may also be monitored as to their present state as active or deactive and verified. In addition to the lead, trail and lead out mode, the locomotive or train may be switched between a passenger and freight modes.

Any of various information stored by the controller 40 of the electric brake valve may also be provided or a fault summaries selected from a menu. Activation and monitoring an embedded self health test is also an option. The current version of the software running in the system may be called up from the menu to be viewed as well as the locomotive number.

The system also has the ability to input various information into the system using the controller 40 and the electric brake valve EBV. The particular item can be selected from the menu by scrolling the menu and pressing one of the multiple position switches. The information being multiple digit may be entered one digit at a time. The digit may be selected by one of the multiple position switches. The value for the individual digit is selected by using another of the multiple position switches. This is the same method used as the feed valve value. Once the particular digit is set, one of the other multiple switches are then activated to then move on the next digit. Once the information is entered one of the two or three button switches may moved to store and or transmit the data entered.

As previously discussed, the selection of the information to be viewed may be selected from a menu which is scrolled, or maybe based on one of many dedicated don't care or safe combinations of positions of the brake handles 31 and 32.

The display with the variable and other information will remain active for a given period of time after the selection and or adjustment then it will disappear allowing the display to be used for its standard brake signal operations.

Don't care combination of handle positions may include, as discussed above, a suppression position for the automatic brake handle 31. This position is ignored by the microcomputer logic and can be used to drive the display 33 with information related to the braking activity. Another don't care combination of positions is for the automatic brake handle 31 to be in its emergency position and the independent brake handle 32 to be in a full position this is considered redundant.

Figure 4:
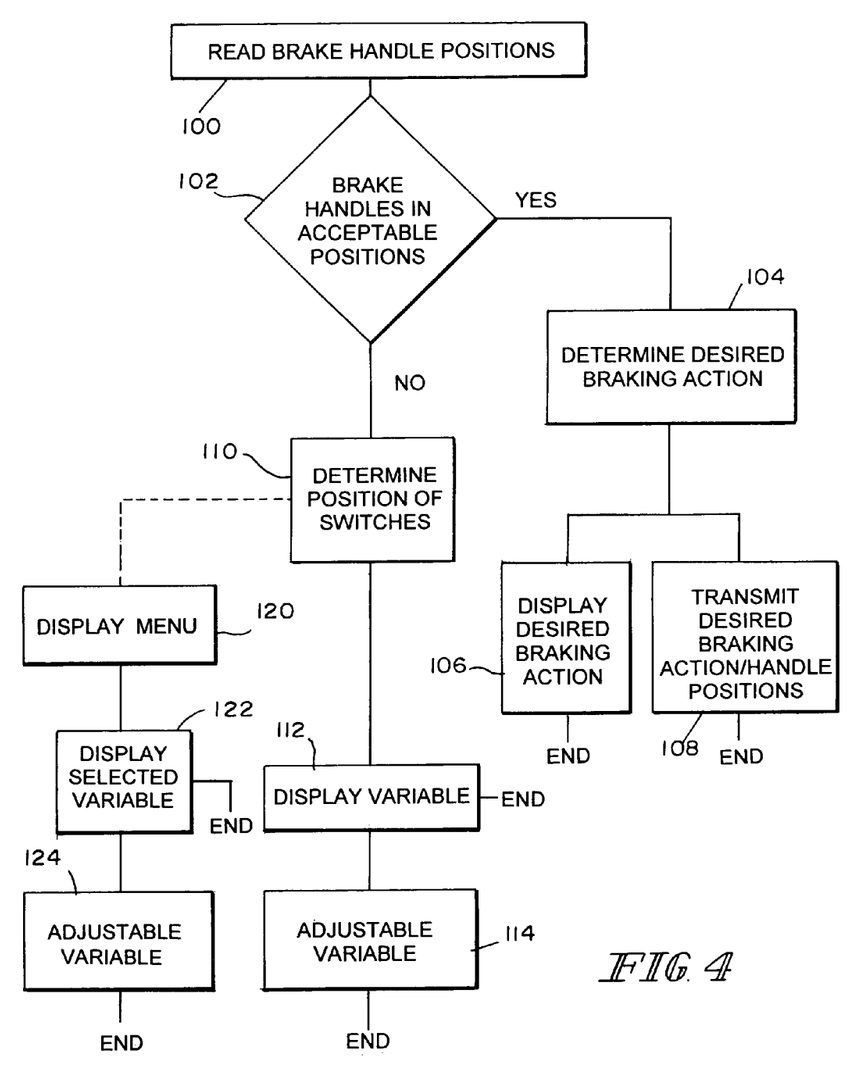
FIG. 4 is a flow chart of a process according to the present disclosure.

FIG. 4 shows a flow chart of the process for driving the display 33.

At step 100 the brake handle positions are read. Next there is a determination step 102 of whether the brake handles are in an acceptable combination of positions. If they are, then there is a determination made at step 104 to determine the desired braking action. The desired braking action is then displayed in step 106 and/or transmitted in step 108. The sequence then ends.

If the brake handles are in an don't care combination of positions, then there is a determination of the positions or state of the switches at step 110. In a simple example, based on the position of the switches and or the brake handles, a selected variable is displayed at step 112. If there is not adjustment this is the end. If there is an adjustment component then it is adjusted at 114. This is the end of the process.

For certain variables and more complicated instances, a menu is displayed at step 120. A variable within the menu is selected and displayed at step 122. If it is merely displayed, this is the end of the process. The variable may also be adjusted at step 124, which can then conclude the process.

The microcomputer 40 can also run diagnostic programs continuously. Switch positions will be checked against analog values to determine whether either of the handles have failed. Failures or other faults will be logged in an event log and fault summary and an event message will be sent to the system indicating the source of the problem.

Preferably, the display is an alphanumeric dot matrix type of display with built in LED backlights. The display will have two rows with 16 characters per row. This will allow an alpha-display of the name of the information being provided as well as an additional display of the values or alpha display of the zones.

Although the description with respect to FIG. 3 shows receiving inputs from a dual handle controller, the electronic logic and the providing of the display can be used with any other brake operator controller, whether it be a single handle or multiple handles, or push buttons. A single handle will have acceptable and don't care positions corresponding to the two handle examples discussed above. If push buttons are used as the brake operators, the amount of braking is proportional to the amount of time the button is depressed alone or in combination with the depth of the button. Also, the digital and analog inputs represented are from presently available systems, for example, in the CCB available from New York Air Brake Corporation. Different input signals from other types of handles and electronics may be inputted and used by the circuitry of FIG. 3. For locomotives not equipped with a control display for the operator, for example 26L equipment, other brake data or parameters may be displayed on display 33. The data or parameters may be in the microcomputer or received via the network. These may include locomotive and train settings or equalization reservoir settings as well as the results of the diagnostic programs. Although a microcomputer 40 is shown as a Neuron, other microcomputers having greater capability may be provided.

For example in 26L air brake systems do not include cab electronics as the system shown in FIG. 1. The Integrated Processor Module is replaced by a Relay Control Portion (RCP). The RCP is an "intelligent" contains electromechanical relays to allow operation of brake system interface devices such as sanding control, power cut-off, etc. An IPM is not required for the CCB-26 system, because there is no LSI Display and other IPM functions have been moved elsewhere in this system. Yet, the IPM can easily be added later if a user opts to upgrade a CCB-26 equipped locomotive with distributed power functionality.

Traditional LSI locomotives, like shown in FIG. 1 include a screen which is used for certain air brake man-machine interface functions. These include selection of the air brake mode (lead, trail, cut-in, and cut-out) as well as setting the "feed valve" or equalizing reservoir set pressure at release. Additionally, the LSI screen allows the air brake system to post crew advisory messages. With no screen, these functions have been added to the brake system as shown by the modified 26L brake valve shown in FIG. 5. It includes electronics similar to the CCB brake valves shown in FIG. 3. It includes the automatic brake handle 31, independent brake handle 32 and a bail-off switch (not shown). The easy to read digital display 33 provides information. Also part of the electronic brake valve EBV includes the feed valve switch 37 and the locomotive mode select switch 38.

Figure 5:
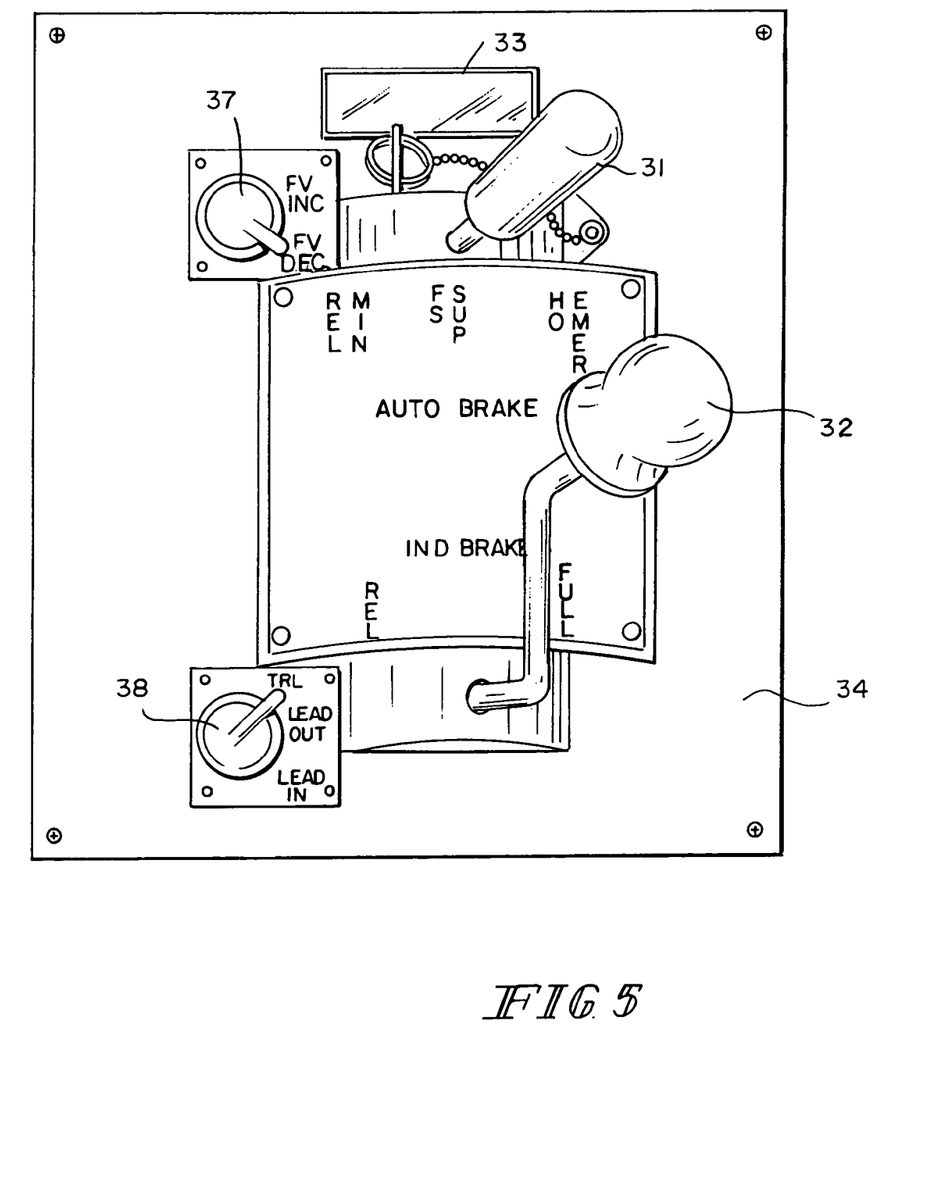
FIG. 5 is a front view of another electronic brake controller with display according to the present disclosure.

The mode select switch 38 may be a rotary-style switch for selection of air brake operating mode: Lead Cut-In, Lead Cut-Out, or Trail Cut-Out. The switch position is encoded by four discrete digital switch signals. Each mode is represented by a unique code. The codes represented by all four inputs closed (as in a "coffee spill" short) or all four inputs open (as in a signal cable break) are invalid and do not cause a change of mode. This scheme also insures that failure of a single digital input can cause a mode transition, but instead is recognized by supervisory diagnostics.

The feed valve switch maybe a spring-centered switch. Using this switch, the operator can increase or decrease the ER release set pressure by holding the switch to the appropriate side. The operator can watch his pneumatic gauge to make this adjustment, or watch the LCD display 33 screen on the EBV to see the selected target pressure digitally.

Figure 6A:
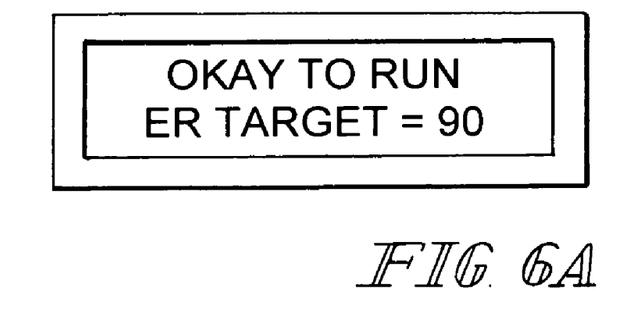
FIGS. 6A-6D are examples of messages in the display of the electronic brake controller.

The display 33 is shown as a two line LCD unit which allows for crew advisory messaging and display of diagnostic information in the event of a failure. This display will advise the operator when a penalty or emergency brake is being enforced, and how to reset. FIG. 6A depicts the 'default' message on the screen. This message tells the operator that "all systems are go" and also the target ER pressure. The ER target display allows the operator to know the target brake pipe pressure for the handle position he/she has selected. In this manner, the operator has instantaneous feedback for handle movement, and does not have to wait for the actual pressure reduction to occur to know if the handle position matches his/her desired action.

Figure 6B:
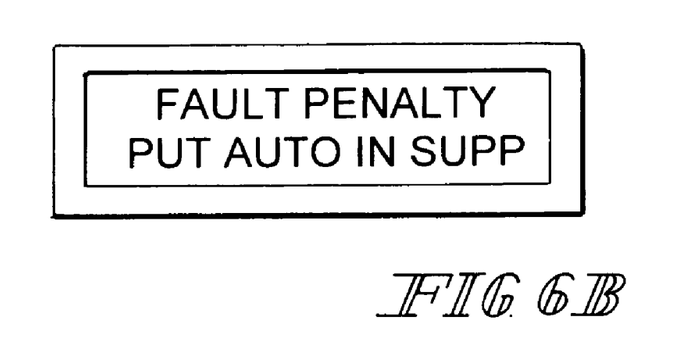

FIG. 6B demonstrates the messaging that is provided when a penalty brake application occurs. The operator is prompted to place the auto handle in the SUPPRESSION position. Another message tells the operator to keep the handle in SUPPRESSION, until the penalty source is cleared and the brake pipe can be recharged.

Figure 6C:
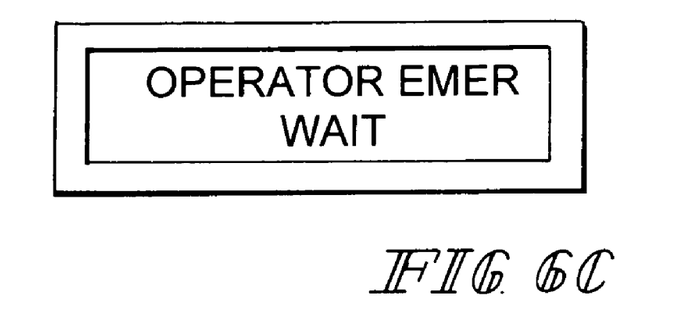

FIG. 6C shows the messaging that is posted following an emergency brake application. First, the operator is prompted to put the auto handle into the EMERGENCY position, if it isn't already there. Then, the message to "WAIT" is posted until the emergency enforcement period is complete.

Figure 6D:
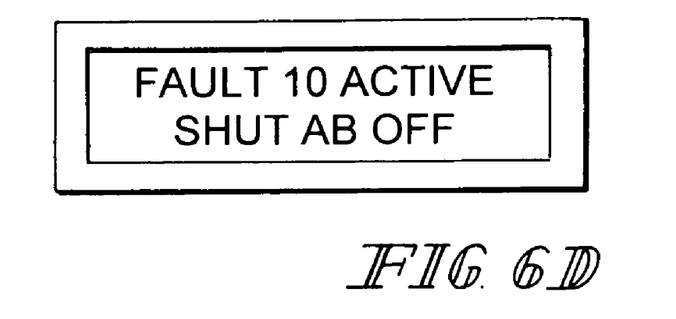

FIG. 6D is an example of a message that would be posted in a fault condition. Some critical faults may require the brake system to be powered off. Others may indicate trail use only, or advise "service soon" with inclusion of a fault code for maintenance purposes.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An electronic brake controller for an electropneumatic brake system, the controller comprising:
    a housing;
    at least one brake operator mounted to said housing and whose positions dictate a desired brake action when the at least one brake operator is in acceptable positions;
    a display on said housing;
    a signal output provided in the housing;
    a multiple position switch on the housing and whose positions are each associated with one of a plurality of brake system variables other than the desired brake action; and
    a controller unit in said housing determining the position of the at least one brake operator and the multiple position switch,
        wherein, when the at least one brake operator is in acceptable positions, the controller unit drives the display to display the desired brake action, and
        wherein, when the at least one brake operator is in don't care positions, the controller unit drives the display to display one of the plurality of brake system variables.

2. The electronic brake controller of claim 1, wherein the controller unit adjusts the displayed one of the plurality of brake system variables as a function of the position of the multiple position switch when the at least one brake operator is in don't care positions.

3. The electronic brake controller of claim 2, wherein the multiple position switch determines a direction of scrolling of the display to adjust the displayed one of the plurality of brake system variables.

4. The electronic brake controller of claim 1, wherein the at least one brake operator is one of a train brake operator and locomotive brake operator, and the multiple position switch is one of a feed valve switch having neutral, increase and decrease positions and a locomotive mode switch having at least an in and out position.

5. The electronic brake controller of claim 1,
    wherein the multiple position switch is a feed valve switch having neutral, increase and decrease positions,
    wherein the controller unit drives the display to display a target feed valve value as the displayed one of the plurality of brake system variables.

6. The electronic brake controller of claim 1, wherein the controller unit drives the display to display the one of the plurality of brake system variables and adjustment thereto in response to the position of the multiple position switch.

7. The electronic brake controller of claim 6, wherein the controller unit drives the display for a predetermined period after adjustment of the displayed one of the plurality of brake system variables.

8. The electronic brake controller of claim 1, wherein the multiple position switch is a mode switch and the controller unit drives the display to display a locomotive mode and adjusts the locomotive mode under control of the mode switch when the at least one brake operator is in don't care positions.

9. The electronic brake controller of claim 1, wherein the controller unit drives the display to display a menu to allow selection of one of the plurality of brake system variables when the at least one brake operator is in don't care positions.

10. The electronic brake controller of claim 1, further comprising a plurality of brake operators including the at least one brake operator,
wherein, when the plurality of brake operators are in acceptable combinations of positions, the controller unit drives the display to display the desired brake action, and
wherein, when the plurality of brake operators are in don't care combinations of positions, the controller unit drives the display to display one of the plurality of brake system variables; and
wherein a don't care combination of positions includes one position being an emergency position and the other position being in a full brake application position.

11. The electronic brake controller of claim 1, further including a two position switch, wherein when the at least one brake operator is in don't care positions, the controller unit changes the type of displayed system variables as a function of the position of the two position switch and adjusts the displayed one of the plurality of brake system variables as a function of the position of the multiple position switch.

12. The electronic brake controller of claim 11, wherein the displayed one of the plurality of brake system variables is a multi digit number and the controller unit sequences through the digits of the multi digit number in response to the two position switch, and
wherein the controller unit adjusts a digit of the multi digit number in response to the position of the multiple position switch.

13. The electronic brake controller of claim 11,
wherein the multiple position switch is one of a feed valve switch and a lead/trail mode select switch, and
wherein the two position switch is one of a bail locomotive brake switch and the other of the feed valve switch and the lead/trail mode select switch.

14. The electronic brake controller of claim 1, wherein the multiple position switch is either a feed valve switch or a locomotive mode select switch.

15. The electronic brake controller of claim 1, wherein the controller unit provides a display of available languages for the display and selection of a display language is made based on the position of the multiple position switch.

16. The electronic brake controller of claim 1, wherein the controller unit displays an identification of a plurality of transducers in the housing and selects and adjusts an output value of a selected transducer as a function of the position of the multiple position switch.

17. The electronic brake controller of claim 1, wherein the controller unit displays a list of electrical devices in the housing and selects an electrical device from the list, whereby an associated state or output value is displayed as a function of the position of the multiple position switch.

18. The electronic brake controller of claim 17, wherein the controller unit adjusts either the state or output value of the selected electrical device as a function of the position of the multiple position switch.

19. The electronic brake controller of claim 17, wherein the controller unit drives the display to display fault messages and instructions.

20. An electronic brake controller for an electropneumatic brake system comprising:
a housing;
first and second brake operators mounted to the housing and whose positions dictate desired brake actions when the first and second brake operators are in acceptable positions;
a display on said housing;
a signal output provided in the housing; and
a controller unit in said housing determining the positions of said first and second brake operators,
wherein, when the first and second brake operators are in acceptable combinations of positions said controller unit drives the display to display the desired brake action as a function of the determined positions of the first and second brake operators, and
wherein, when the first and second brake operators are in don't care combinations of positions, the controller unit drives the display to display one of a plurality of brake system variables based on a position of a multiple position switch.

21. A method of driving a display on an electronic brake controller, the brake controller having at least one brake operator having a position that dictates a desired brake action, and a multiple position switch on a housing having positions each associated with one of a plurality of brake system variables other than the desired brake action, the method comprising:
determining positions of the at least one brake operator and the multiple position switch;
for acceptable positions of the at least one brake operator, driving the display to display desired brake action as a function of the determined position of the at least one brake operator; and
for don't care positions of the at least one brake operator, driving the display with one of a plurality of brake system variables and adjusting the displayed one of the plurality of brake system variables as a function of the position of the multiple position switch for don't care positions of the at least one brake operator.

* * * * *